(12) United States Patent
Sinha et al.

(10) Patent No.: US 8,935,807 B2
(45) Date of Patent: Jan. 13, 2015

(54) VISUAL SECUREMENT OF SENSITIVE DATA

(71) Applicants: Anand Sinha, Bangalore (IN); Vinay Sheel, Bangalore (IN)

(72) Inventors: Anand Sinha, Bangalore (IN); Vinay Sheel, Bangalore (IN)

(73) Assignee: SAP SE, Walldorf (DE)

( * ) Notice: Subject to any disclaimer, the term of this patent is extended or adjusted under 35 U.S.C. 154(b) by 89 days.

(21) Appl. No.: 13/688,179

(22) Filed: Nov. 28, 2012

(65) Prior Publication Data

US 2014/0150114 A1 May 29, 2014

(51) Int. Cl.
*G06F 21/10* (2013.01)
*G06F 21/62* (2013.01)
*H04W 12/00* (2009.01)

(52) U.S. Cl.
CPC .............. *G06F 21/62* (2013.01); *H04W 12/00* (2013.01); *G06F 2221/2111* (2013.01)
USPC .......................................................... 726/28

(58) Field of Classification Search
CPC ................................ H04L 29/06; G06F 17/00
USPC ........................................................ 726/28, 1
See application file for complete search history.

(56) References Cited

U.S. PATENT DOCUMENTS

| 6,956,979 B2 * | 10/2005 | Janakiraman et al. ........ 382/301 |
| 7,831,732 B1 * | 11/2010 | Zilist et al. .................... 709/237 |
| 8,020,192 B2 * | 9/2011 | Wright et al. .................... 726/1 |
| 2009/0144619 A1 * | 6/2009 | Best et al. ...................... 715/277 |

* cited by examiner

*Primary Examiner* — Teshome Hailu
*Assistant Examiner* — Thanh Le

(57) ABSTRACT

Various embodiments of systems and methods for visual securement of sensitive data are described herein. In one aspect, the method includes receiving a request for displaying a report. It is determined whether the requested report comprises sensitive data. When the report comprises the sensitive data, a display rule related to the sensitive data is identified. Based upon the identified display rule, the sensitive data within the report is displayed.

19 Claims, 17 Drawing Sheets

| S1 | S2 | S3 | S4 | NS1 | ... | NSN |
|----|----|----|----|-----|-----|-----|
| E1 | U1 | V1 | W1 | X1  | ... | Z1  |
| E2 | U2 | V2 | W2 | X2  | ... | Z2  |
| E3 | U3 | V3 | W3 | X3  | ... | Z3  |
| E4 | U4 | V4 | W4 | X4  | ... | Z4  |
| E5 | U5 | V5 | W5 | X5  | ... | Z5  |

| SALES REVENUE REPORT 1200 | | | | |
|---|---|---|---|---|
| CATEGORY | YEAR | | QUANTITY SOLD | NET SALES |
| SHIRTS | 2004 | | 1,263 | $230,001.30 |
| SHIRTS | 2005 | | 537 | $127,034.10 |
| SHIRTS | 2006 | | 3,642 | $715,960.30 |
| BERMUDAS | 2004 | | 175 | $29,790.30 |
| BERMUDAS | 2005 | | 253 | $53,793.70 |
| BERMUDAS | 2006 | | 189 | $21,586.90 |
| BOATWEAR | 2004 | | 281 | $42,760.10 |
| BOATWEAR | 2005 | | 132 | $18,949.60 |
| BOATWEAR | 2006 | | 1,074 | $183,334.70 |
| CARDIGAN | 2004 | | 1,876 | $267,192.70 |
| CARDIGAN | 2005 | | 3,824 | $619,336.00 |
| CARDIGAN | 2006 | | 435 | $35,265.10 |

VISUAL SECUREMENT OF SENSITIVE DATA

BACKGROUND

With the advent of the internet and portable computing devices, information can be accessed easily and quickly from anywhere. Users can access reports such as business intelligence reports from anywhere and at any time over wireless communication networks. Some reports may include sensitive data. Accessing such reports from public places may not be secure and users may be asked not to open such records in public. Asking users not to open the reports is not an effective or a reliable approach for protecting sensitive data. Some security measures involve restricting the access of reports in public places. Restricting the access of report can be unproductive in situations where users need to immediately work on the report from some public place. Other security measures involve password protection where users are required to enter a password before opening the reports with sensitive data. However, password protection is also not effective because once the report is opened, the sensitive data is exposed.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 2 illustrates a tabular report, as an example.

FIG. 12 illustrates an exemplarily sales revenue report visually secured by blurring sensitive data, according to an embodiment.

DETAILED DESCRIPTION

Figure 1:
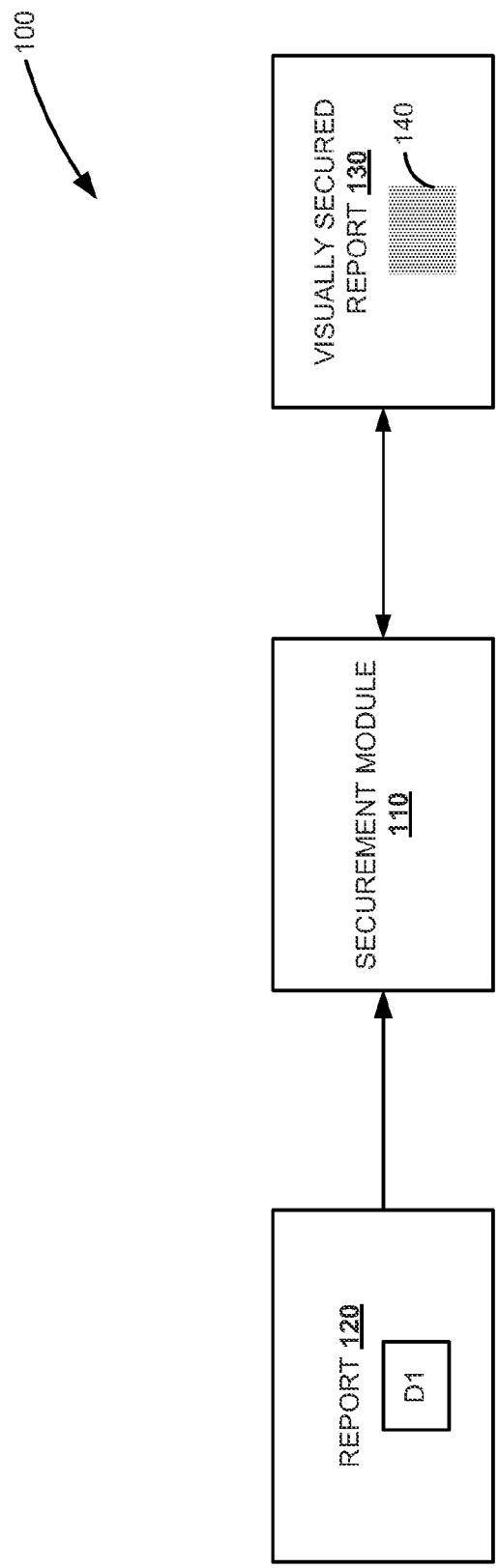
FIG. 1 is a block diagram of a system including a securement module for securing sensitive data of a report, according to an embodiment.

Embodiments of techniques for visual securement of sensitive data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Report may be a document which presents information to a specific audience. For example, a business intelligence (BI) report presents salient content to business users such as business analysts. The report can include tables, charts, graphical elements, etc. In one embodiment, the report is a graphical report including one or more graphs. In one embodiment, the report is a tabular report comprising one or more data fields. For example, the tabular report 'employee profile' may include data fields such as employee name, address, salary, etc. Each data field of the report includes one or more data or values. For example, the data field employee name includes data, e.g., Alex, Tom, Rim, etc.

Critical or sensitive data fields are those data fields of the report which can be of more interest to a user or otherwise emphasized. What is sensitive may vary depending on the context. In one context, the data fields which are more frequently analyzed in the report may be sensitive. In one embodiment, the data fields including personal information may be sensitive. In some embodiments, the sensitive data fields are predefined at design-time, i.e., during a design or development phase of the report. Usually, a report designer specifies the sensitive data fields. For example, the report designer may specify the data field 'employee name' as 'sensitive' data field. In one embodiment, the data fields are specified 'sensitive' at runtime by a user. In one embodiment, the data fields are automatically specified 'sensitive,' based upon user's behavior. In one embodiment, the data fields are specified sensitive by recording those data fields which are more frequently accessed by the user. In one embodiment, an access count of the data field is recorded and if the access count exceeds a predefined number, the data field is automatically specified as the sensitive data field.

Sensitive data are parts of the report which are important and subject to privacy. In one embodiment, the sensitive data are data associated with the sensitive data fields. For example, the data such as Alex, Tom, Rim, etc., of the sensitive data field 'employee name' are automatically marked as 'sensitive' data. In some embodiments, each data is individually specified as 'sensitive' or 'non-sensitive' at design-time of the report. For example, the data related to personal information of a particular user may be specified as 'sensitive' data at design-time of the report.

FIG. 1 illustrates one embodiment of a system 100 including a securement module 110 for visually securing sensitive data D1 of a report 120. The sensitive data D1 of the report 120 is visually secured to generate a visually secured report 130. A visually secured data 140 is obscured as shown in visually secured report 130. In one embodiment, once a request for displaying the report 120 is received, the securement module 110 determines whether the report 120 includes any sensitive data. In one embodiment, the securement module 110 determines that the report 120 includes sensitive data if a property 'IS_SENSITIVE' for any data is set 'TRUE.' When it is determined that the report 120 includes sensitive data, e.g., D1, the securement module 110 identifies a display rule associated with the sensitive data D1. In one embodiment, the display rule for the sensitive data D1 is predefined. In one embodiment, the display rule is related to visually securing (e.g., obscuring) the sensitive data D1. The sensitive data D1 is visually secured according to the identified display rule to generate the visually secured report 130. The visually secured report 130 including the visually secured data 140 is displayed to an end user. In one embodiment, the sensitive data D1 is visually secured based upon various parameters, e.g., location of a portable computing device from which request for displaying the report 120 is received.

FIG. 2 illustrates a tabular report 200, as an example. The tabular report 200 includes sensitive data fields S1-S4 and non-sensitive data fields NS1-NSN. In one embodiment, the sensitive data fields S1-S4 are data fields including more important information. In one embodiment, the sensitive data fields S1-S4 are more frequently analyzed data fields. The sensitive data fields S1-S4 may be predefined at design-time. In one embodiment, a report designer defines the sensitive data fields S1-S4 at design time. The sensitive data fields may be defined by setting the property 'IS_SENSITIVE' of the data fields S1-S4 as 'TRUE.' In one embodiment, the sensitive data fields S1-S4 are specified at runtime by the end user. In another embodiment, the sensitive data fields S1-S4 may be determined automatically at runtime. In yet another embodiment, the sensitive data fields may be determined automatically by recording the data fields frequently accessed by the end user.

The data corresponding to the sensitive data fields automatically becomes sensitive data. For example, the data E1-E5 related to the sensitive data field S1, the data U1-U5 related to the sensitive data field S2, the data V1-V5 related to the sensitive data field S3, and the data W1-W5 related to the sensitive data field S4, automatically becomes sensitive data. In one embodiment, each specific data, e.g., E1, can be independently configured as sensitive or non-sensitive.

Figure 3:
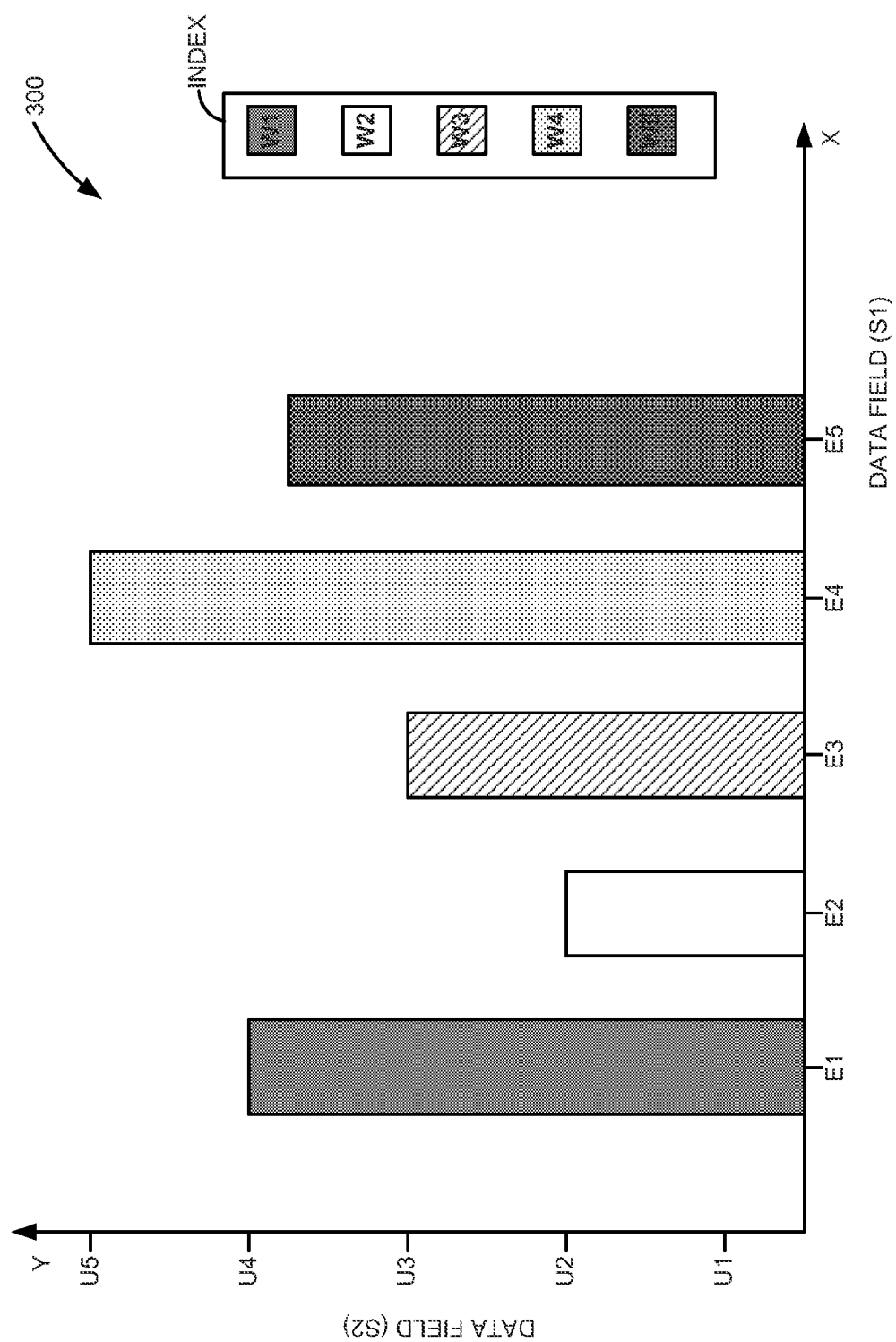
FIG. 3 illustrates a graphical report, as an example.

FIG. 3 illustrates a graphical report 300, as an example. The graphical report 300 is based on the data in the tabular report 200. In one embodiment, the data E1-E5, U1-U5, and W1-W5 which are specified as sensitive in the tabular report 200, automatically becomes sensitive in the graphical report 300. In one embodiment, the data E1-E5, U1-U5, and W1-W5 are specifically set as 'sensitive' or 'non-sensitive' in the graphical report 300. In one embodiment, the end user specifies the sensitive data of the graphical report 300 at runtime. For example, the end user may specify the data E1-E5 and U1-U5 as sensitive data of the graphical report 300.

Figure 4:
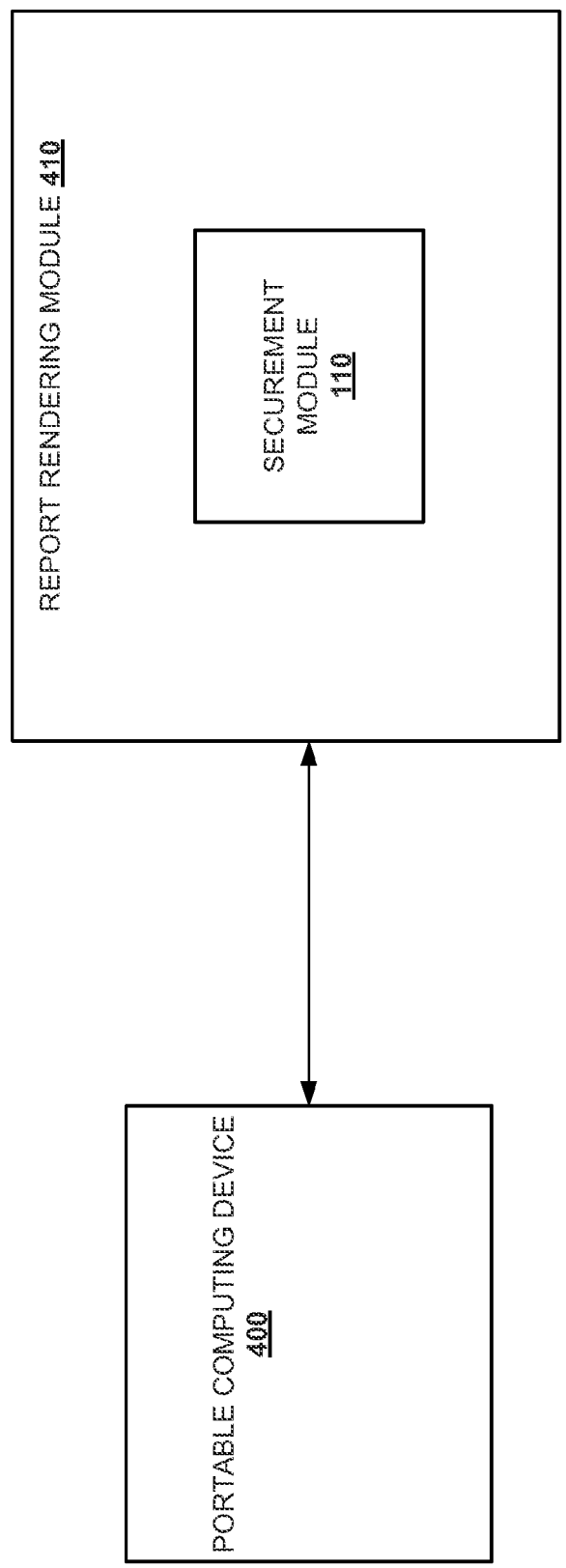
FIG. 4 is a block diagram illustrating a report rendering module communicatively coupled to a portable computing device, according to an embodiment.

Referring to FIG. 4, a request for displaying the report, e.g., the graphical report 300 or the tabular report 200 may be received from a portable computing device 400. The end user can send the request from anywhere using the portable computing device 400. For example, the end user may send the request from his mobile phone from any public place such as airport, railway station, market place, bus stand, etc. The portable computing device 400 may be any computing device which can be carried by the end user, e.g., a laptop, a mobile phone, a smartphone, a tablet computer, etc. The end user sends the request for displaying the report, e.g., the report 200, from the portable computing device 400. The request is received by a report rendering module 410. The report rendering module 410 is communicatively coupled to the portable computing device 400. In one embodiment, the report rendering module 410 may be a part of the portable computing device 400.

Figure 5:
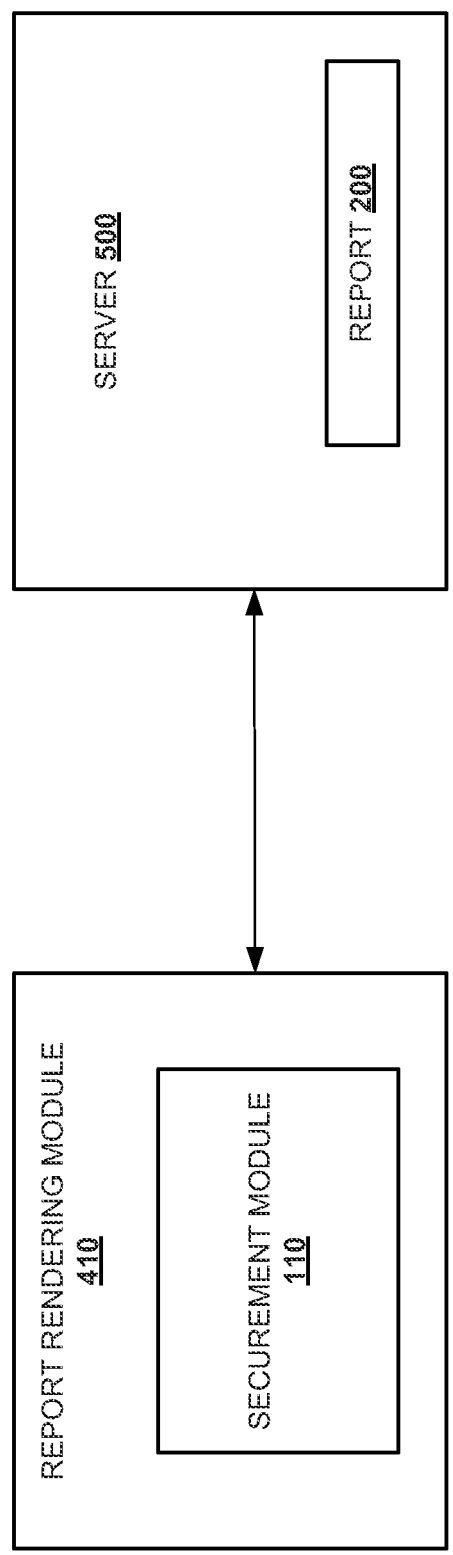
FIG. 5 is a block diagram of the report rendering module communicatively coupled to a server storing reports, according to an embodiment.

Once the request is received by the report rendering module 410, the report rendering module 410 looks for the requested report, e.g., the report 200, on a server 500, shown in FIG. 5. The report rendering module 410 is communicatively coupled to the server 500 that stores the reports. In one embodiment, the server 500 may be a business intelligence (BI) server. In one embodiment, the report rendering module 410 may be a part of the server 500. The report rendering module 410 communicates with the server 500 to check the availability of requested report, e.g., the report 200.

In one embodiment, when the requested report is not available on the server 500, the report rendering module 410 displays an error message on the portable computing device 400. Few exemplary error messages may be "not available," "error." "unidentified report," etc. In case the requested report, e.g., the report 200, is available on the server 500, the report rendering module 410 generates an instance of the requested report 200. In one embodiment, the report rendering module 410 includes the securement module 110. The securement module 110 determines if the requested report 200 includes any sensitive data. In one embodiment, the securement module 110 determines if the requested report 200 includes any sensitive data by determining if the requested report 200 includes any sensitive data fields. In one embodiment, the securement module 110 refers to report definition to determine whether the report includes any sensitive data field. Typically, the securement module 110 determines whether the property named 'IS_SENSITIVE' for any data field is 'TRUE.' If the property 'IS_SENSITIVE' for any data field is 'TRUE,' it is determined that the report includes sensitive data field. By default, the property 'IS_SENSITIVE' for all the data fields is set 'FALSE.' At design-time of the report 200, the property 'IS_SENSITIVE' may be set 'TRUE' for the sensitive data fields S1-S4.

Once it is determined that the report 200 includes sensitive data fields S1-S4, the securement module 110 identifies the display rule associated with the sensitive data fields S1-S4. In one embodiment, the display rule is predefined for each of the sensitive data fields S1-S4. The display rule is related to visual securement of the sensitive data E1-E5, U1-U5, V1-V5, and W1-W5 of the sensitive data fields S1-S4. In one embodiment, a separate display rule may be defined for each sensitive data field S1-S4. The display rule may be predefined at design-time of the report 200. In one embodiment, the display rule may be revised or updated. The display rule associated with the sensitive data fields S1-S4 is for obscuring their respective data E1-E5, U1-U5, V1-V5, and W1-W5. In one embodiment, the display rule executes a procedure for obscuring the sensitive data E1-E5, U1-U5, V1-V5, and W1-W5.

In one embodiment, the sensitive data E1-E5, U1-U5, V1-V5, and W1-W5 is obscured in the instance of the report 200 generated by the report rendering module 410. The securement module 110 applies the display rule on the instance of the report 200 and not on the actual report 200 which is stored on the server 500.

Figure 6:
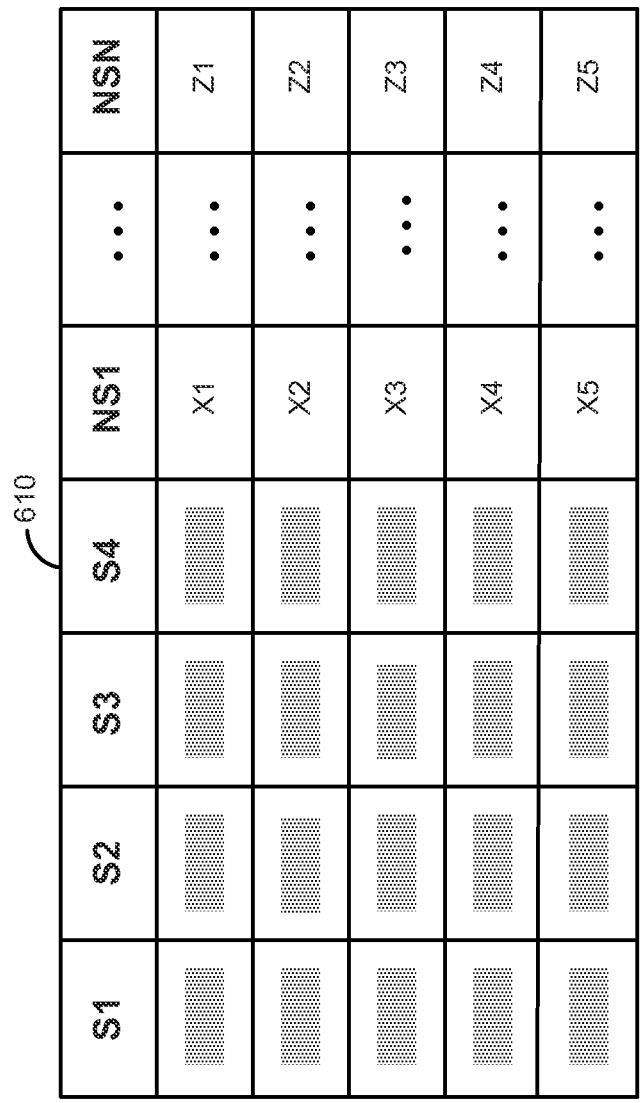
FIG. 6 illustrates a visually secured report generated by the report rendering module with blurred sensitive data, according to an embodiment.

In one embodiment, the procedure for obscuring the sensitive data E1-E5, U1-U5, V1-V5, and W1-W5 includes blurring or smudging the sensitive data E1-E5, U1-U5, V1-V5, and W1-W5, as shown in FIG. 6. The sensitive data E1-E5, U1-U5, V1-V5, and W1-W5 may be blurred using any suitable blurring or smudging algorithm known in the art to generate a visually secured report 610. For example, a Gaussian image blur algorithm may be used to blur the sensitive data E1-E5, U1-U5, V1-V5, and W1-W5. As shown in FIG. 6, the visually secured report 610 includes unobscured non-sensitive data fields NS1-NSN and the obscured sensitive data fields S1-S4.

Figure 7:
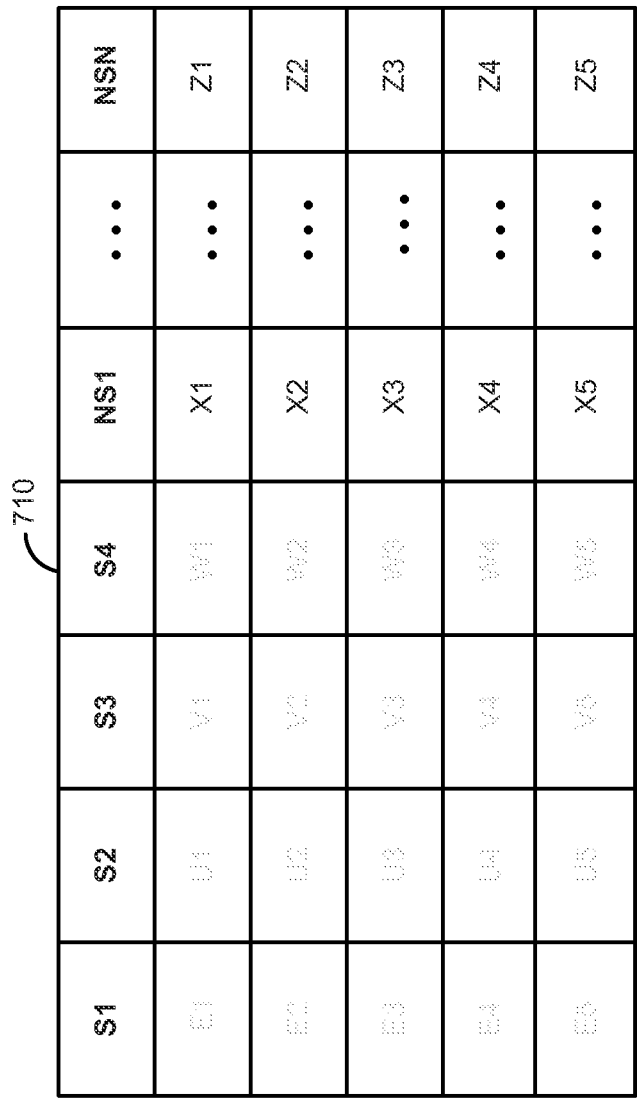
FIG. 7 illustrates a visually secured report generated by the report rendering module with the sensitive data in reduced contrast, according to an embodiment.

In one embodiment, the procedure for obscuring sensitive data includes adjusting contrast of the sensitive data. FIG. 7 illustrates a visually secured report 710 including the sensitive data E1-E5, U1-U5, V1-V5, and W1-W5 with adjusted contrast. The contrast is a difference in luminance and/or color of a displayed data and a background. In one embodiment, the contrast is adjusted by adjusting a color of the sensitive data relative to the background color. In one embodiment, the contrast is adjusted by adjusting the background color relative to the color of the sensitive data. In one embodiment, both the color of the sensitive data and the background color are adjusted relative to each other. The background color may be represented as 'bgc' and the color of the sensitive data may be represented as 'tc.' In some embodiments, the below exemplary algorithm may be executed to adjust the contrast of the sensitive data:

```
ADJUST_CONTRAST(SENSITIVE DATA)
{
    if (tc= 000000)        // 000000 is a hexadecimal code for BLACK
                           color//
        tc= bgc+ε;         // ε is 'epsilon' which indicates small value
    else
        bgc= tc- ε;
}
```

According to the above algorithm, it is determined if the color of the sensitive data (tc) has a default value, e.g., BLACK or 000000 (in hexadecimal format). If the color of the sensitive data (tc) is equal to 000000, it implies that the sensitive data has a default color (e.g., BLACK). The color of the sensitive data then can be changed relative to the color of the background to obscure the sensitive data. In one embodiment, the color of the sensitive data (tc) is changed to the background color+some small value, e.g., {tc=bgc+ε}. In one embodiment, the color of the sensitive data (tc) is changed to the background color–some small value, e.g., {tc=bgc−ε}. In one embodiment, the 'ε' may be any suitable hexadecimal value which ensures small difference between the color of the sensitive data and the background color such as 111111, 112233, 221133, 113333, 222222, etc. For example, the text E1-E5. U1-U5, V1-V5, and W1-W5 is changed to background color (i.e., white)+small value, and therefore, the sensitive data E1-E5, U1-U5, V1-V5, and W1-W5 appears slightest grayish and obscured in FIG. 7. In case the color of the sensitive data (tc) is not default color or BLACK then the color of the sensitive data might be context specific, e.g., RED color to identify that the data requires attention. The color of the context specific data should not be changed. In case the color of the sensitive data (tc)≠BLACK, the background color (bgc) is changed relative to the color of the sensitive data to obscure the sensitive data. For example, the background color (bgc) is changed to the color of the sensitive data±some small value, e.g., {bgc=tc−ε}). Therefore, actual values of color of the sensitive data and the background color are adjusted appropriately to render the sensitive data E1-E5, U1-U5, V1-V5, and W1-W5 difficult to read, thereby protecting the data from prying eyes and cameras, etc. The above stated algorithm is for illustration and any suitable algorithm for adjusting contrast may be used.

In one embodiment, the contrast may be adjusted by adjusting an alpha ($\alpha$) value of the color of the sensitive data or the background color. The alpha value represents opacity and the alpha value varies from 0 to 1, i.e., $0 \leq \alpha \leq 1$. The alpha value 0 represents 100% transparency, i.e., text becomes transparent and invisible. The alpha value 1 represents 0% transparency, i.e., text becomes opaque and clearly visible. By default the alpha value of the color of the sensitive data is 1 and therefore, the text is clearly visible. For obscuring text, the alpha value of the color of the sensitive data may be adjusted so that the text becomes more transparent and obscured. The alpha value of the color of the sensitive data may be adjusted by calling a function "tc=tc.alpha($\alpha$)." For example, the alpha value of the color of the sensitive data may be adjusted by calling a function "tc=tc.alpha(0.03)." In some embodiments, the contrast is adjusted by just adjusting the alpha value of the color of the sensitive data. In some embodiments, the contrast is adjusted by adjusting the color of the sensitive data (e.g., tc=bgc+ε), followed by adjusting the alpha value of the color of the sensitive data.

Figure 8:
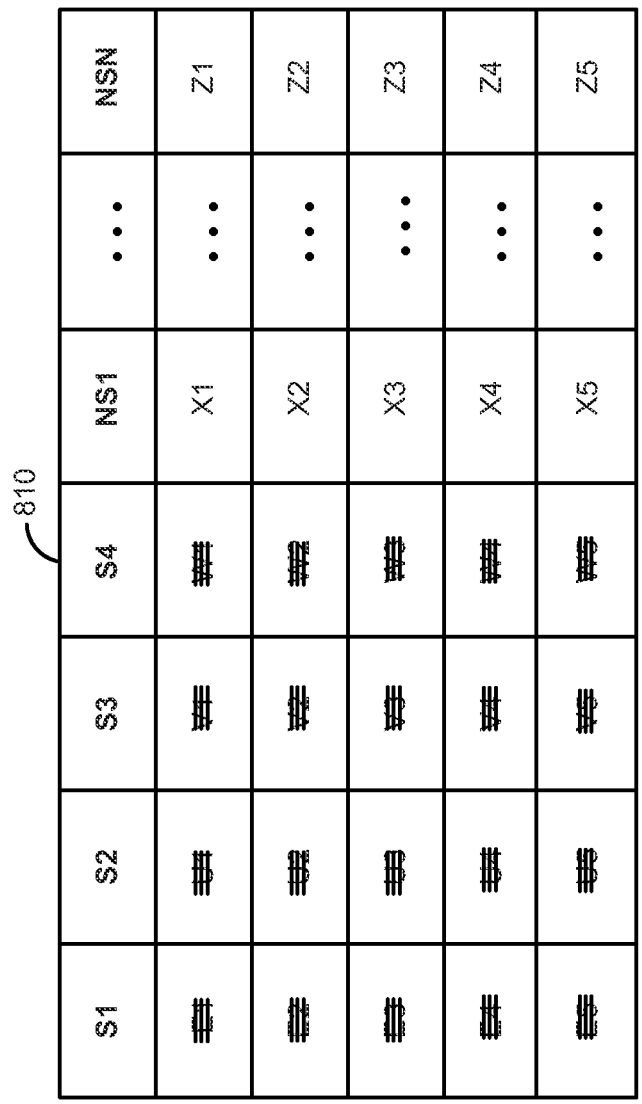
FIG. 8 illustrates a visually secured report generated by the report rendering module with strikethrough of sensitive data, according to an embodiment.

In one embodiment, the procedure for obscuring the sensitive data includes striking out the sensitive data. In one embodiment, the font effect 'strikethrough' or 'double strikethrough' is automatically enabled for the sensitive data. FIG. 8 illustrates a visually secured report 810 including the sensitive data E1-E5, U1-U5, V1-V5, and W1-W5 being obscured using strikethrough.

Figure 9:
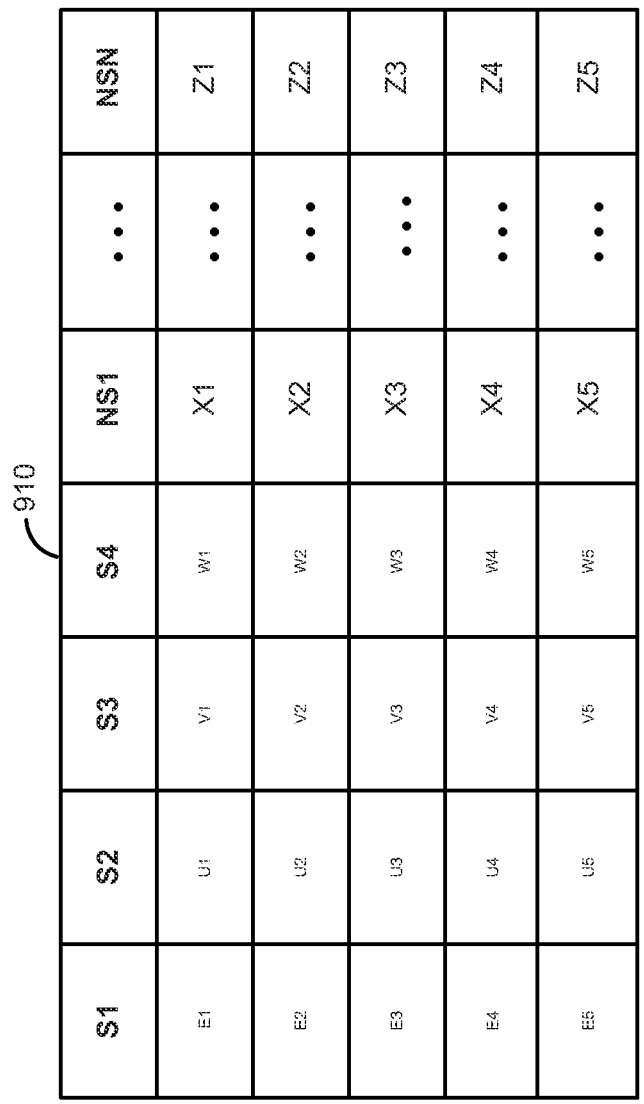
FIG. 9 illustrates a visually secured report generated by the report rendering module with sensitive data in reduced font size, according to an embodiment.

In one embodiment, the procedure for obscuring sensitive data includes reducing font size of the sensitive data. In one embodiment, the font size for the sensitive data is automatically set to certain predefined value. FIG. 9 illustrates a visually secured report 910 with the sensitive data E1-E5, U1-U5, V1-V5, and W1-W5 being obscured by reducing font size.

Figure 10:
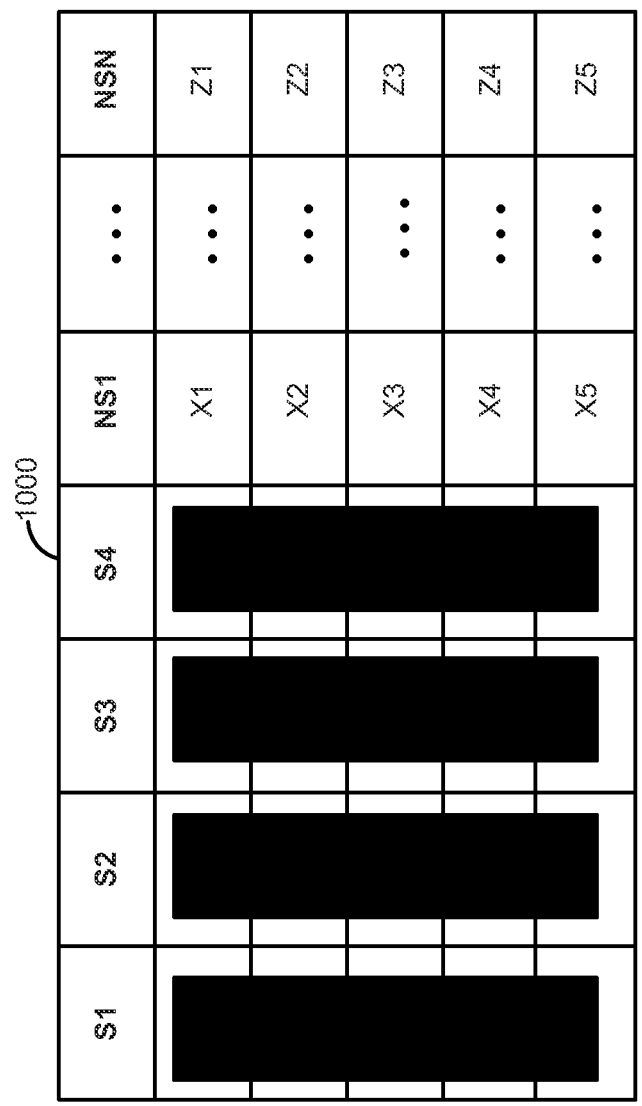
FIG. 10 illustrates a visually secured report generated by the report rendering module by masking the sensitive data by a dark layer, according to an embodiment.

In one embodiment, the procedure for obscuring sensitive data includes masking the sensitive data. In one embodiment, masking includes applying a dark layer (e.g., BLACK patch) upon the sensitive data. FIG. 10 illustrates a visually secured report 1000 including sensitive data E1-E5, U1-U5, V1-V5, and W1-W5 masked with the dark layer. In one embodiment, the dark layer may be applied by calculating a display area covering the sensitive data. For example, the respective display area covering the sensitive data E1-E5, U1-U5, V1-V5, and W1-W5 may be calculated. Once the display area of the respective sensitive data E1-E5, U1-U5, V1-V5, and W1-W5 is calculated, the respective display area may be filled by dark color like BLACK. In one embodiment, the color of the display area may be set as {displayarea.color=000000}. In one embodiment, a single display area covering all the sensitive data E1-E5, U1-U5, V1-V5, and W1-W5 may be calculated and masked with the BLACK patch.

Although some procedures for obscuring sensitive data are described above, it should be understood that other obscuring procedures can be easily adopted. Any new procedure for obscuring data may be easily configured within the securement module 110.

In one embodiment, the display rule calls the procedure for obscuring the sensitive data E1-E5, U1-U5, V1-V5, and W1-W5 based upon various conditional parameters. In one embodiment, the conditional parameter includes at least one of the location information of the portable computing device 400 from which the request for displaying the report 200 is received, a name or an address of a network through which the request is received, a connectivity status of the network including an online and offline status of the network, an authentication information of the end user sending the request, an email address of the end user to whom the report 200 or an screen shot of the report 200 is to be sent, etc.

Examples of display rules for obscuring the sensitive data based on the location information includes (a) "blur sensitive data when location of portable device accessing the report is greater than 2 miles radius from place named XYZ" (b) "blur sensitive data when location of portable device accessing the report is greater than 2 miles radius from place address ABC" (c) "blur sensitive data when location of portable device accessing the report does not has the latitude/longitude value of L1/L2." L1 and L2 can have any suitable numerical value. In one embodiment, various known techniques such as global positioning system (GPS), radio frequency identifier (RFID), geo coding, cell tower location, etc., may be used for determining the location information.

In one embodiment, the display rule including conditional parameter related to the location information may be "strikethrough the sensitive data when employee is not in office." In one embodiment, it may be determined whether the employee is within the office campus or outside based upon the employee entry/exit information. Typically, a database table (IN/OUT register) shown below as Table 1 may be maintained for tracking employee entry/exit details:

TABLE 1

| Employee I No. | Gate # | Time | IN/OUT |
| --- | --- | --- | --- |
| I089 | 2 | 12:00 pm | OUT |
| I764 | 1 | 6:00 am | IN |
| I123 | 4 | 8:00 am | IN |
| I067 | 3 | 6:00 pm | OUT |

In one embodiment, the report rendering module 410 can query a server (not shown) storing Table 1 whether the employee is IN or OUT. For example, the report rendering module 410 queries the server "is I089 IN?" The server checks Table 1 (IN/OUT register) and replies back. If the reply is 'YES,' then the employee is within the office campus and therefore, according to the display rule the report is displayed without striking the sensitive data.

Examples of display rules for obscuring the sensitive data based on the network information such as the address and the status of the network includes (a) "blur sensitive data when network through which request is received is a wireless network unless the name of the wireless network is 'abc'" (b) "blur sensitive data when the network address through which request is received is not 'yz'" (c) "strikethrough sensitive data when connectivity status of the network is 'offline'" (d) "blur sensitive data until SSID is 'pqr'." SSID or service set identifier is a name of a wireless local area network (WLAN). The display rule "strikethrough sensitive data when connectivity status of the network is 'offline'" is applicable for the already downloaded reports.

In one embodiment, the display rule can be based on the authentication information of the end user or the device. Non-authenticated users or devices may not be allowed to view the reports from the server 500. An exemplary display rule including conditional parameter based on the user authentication information may be as "blur sensitive data when the user is not authenticated."

In one embodiment, the display rule can be based on an email address or email_id of a receiver. For example, the display rule may be "blur sensitive data if the report is sent to an unknown email_id." In one embodiment, a screen shot of the report may be sent via email. The securement module 110 determines if the email_id is known or registered. In case the email_id is not registered, the font size of the sensitive data is automatically reduced in the screenshot to be sent to the unregistered email_id. In one embodiment, the display rule for obscuring sensitive data may be applied while sharing the report via social networking sites, e.g., Facebook®, Twitter®, etc.

Figure 11:
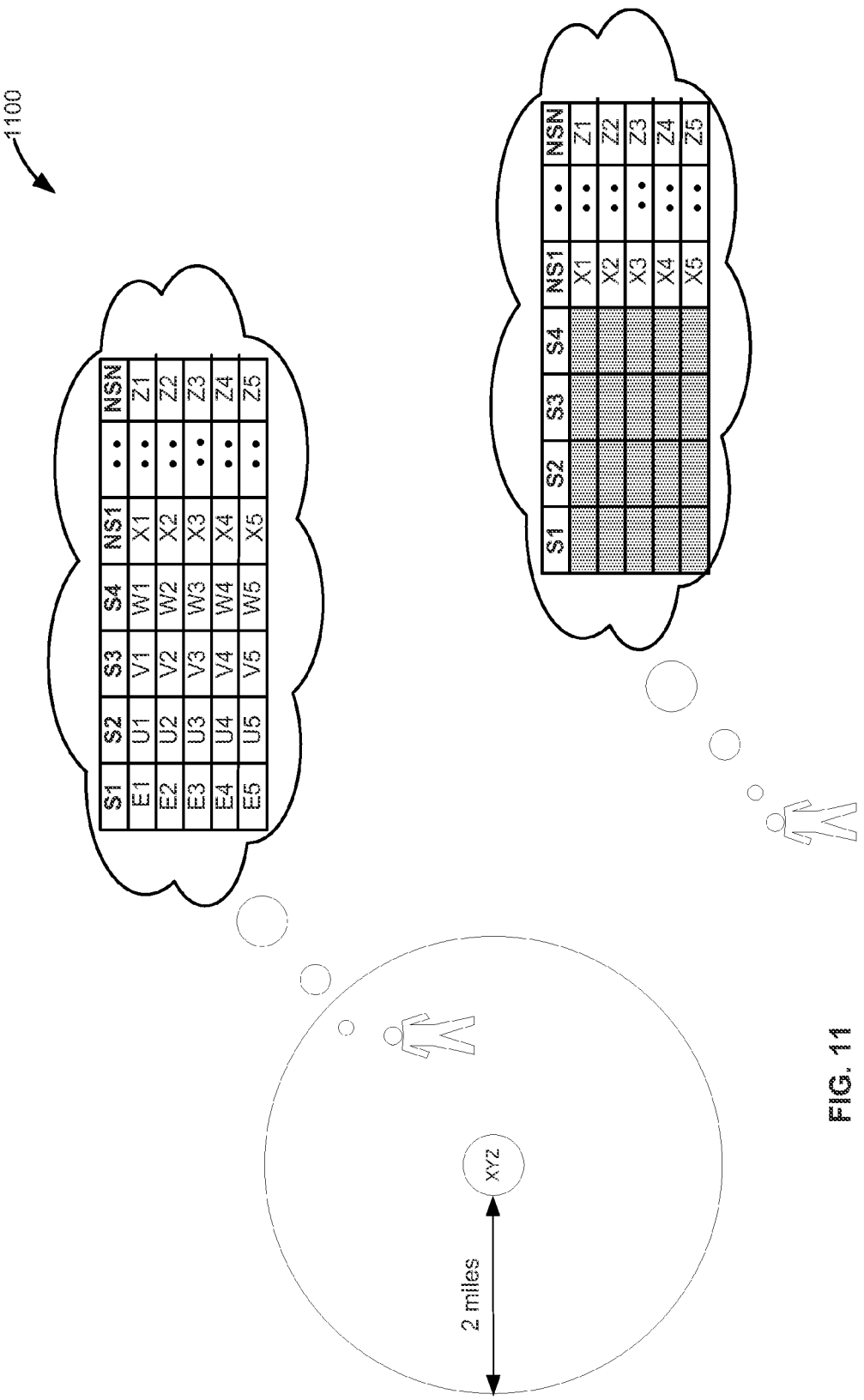
FIG. 11 illustrates displaying report to different users based upon their location information, according to an embodiment.

FIG. 11 illustrates a scenario 1100 where the display rule "blur sensitive data when location of the user accessing the report is greater than 2 miles radius from place named XYZ" is applied to display the report 200 to the user U1 and U2. As shown, the user U1 is within the radius of 2 miles from the location XYZ, therefore, the report is displayed to the user U1 without blurring the sensitive data. However, as the user U2 is located outside the radius of 2 miles, therefore, the user U2 is displayed the report with blurred sensitive data.

Figure 13:
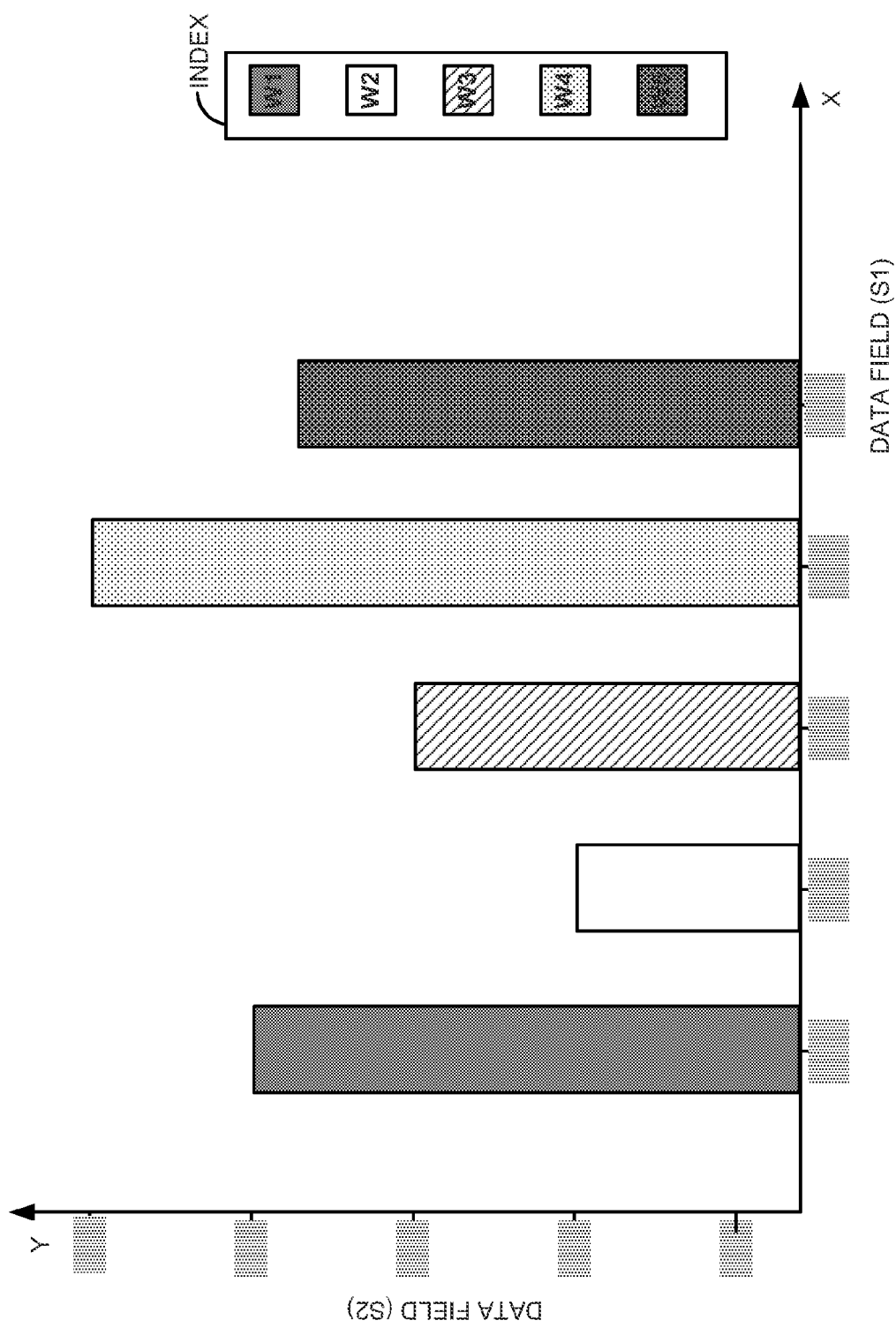
FIG. 13 illustrates the graphical report of FIG. 3 visually secured by blurring sensitive data, according to an embodiment.

FIG. 12 illustrates an exemplary sales revenue report 1200 that is visually secured by blurring the sensitive data, e.g., discount-related data. As shown, the visually secured report 1200 includes the unobscured non-sensitive data fields 'CATEGORY,' 'YEAR,' 'QUANTITY SOLD,' and 'NET SALES' and the obscured sensitive data field 'DISCOUNT.' Similarly, FIG. 13 illustrates the graphical report of FIG. 3 visually secured by blurring the sensitive data E1-E5 of the sensitive data field S1 and U1-U5 of the sensitive data field S2. The non-sensitive data or portion such as 'index' and 'W1-W5' are unobscured. In one embodiment, the non-sensitive portion of the report may include any symbol, text, numeral, etc., which is not required to be secured or obscured. In one embodiment, the non-sensitive portion is non-sensitive data fields of the report which is not required to be secured or obscured.

In one embodiment, the display rule may be overruled based upon some exceptions. For example, if the user accessing the report is granted special permission or privileges then the display rule may be overruled and the sensitive data is not obscured for the user. The special privileges may be associated with a profile or device of the user. The securement module 110 determines if the special privilege is associated with the user. In one embodiment, the securement module 110 determines if the device from which the report is requested is given special privileges. In case the special privilege is associated with the user or device, the display rule is overruled and the sensitive data is not obscured.

Figure 14:
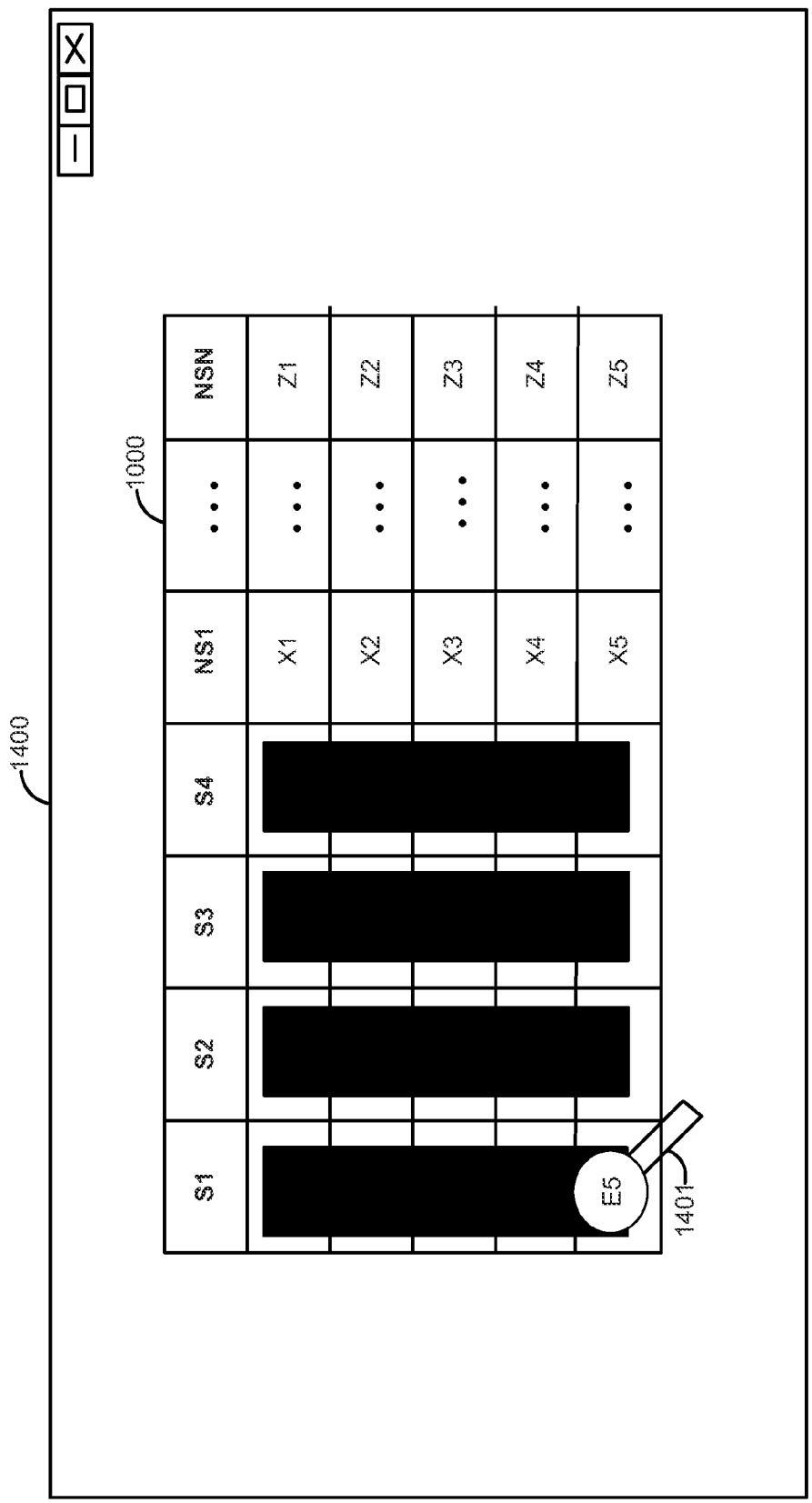
FIG. 14 illustrates a user interface including a user interface element for enabling users view the obscured sensitive data, according to an embodiment.

In one embodiment, as illustrated in FIG. 14, a user interface element 1401 is provided on a screen or a user interface 1400 of the portable computing device 400 to enable users view the obscured data. In one embodiment, the UI element 1401 may be a magnifier glass kind of element. The UI element 1401 is navigable and the user can position the UI element 1401 anywhere on the screen. The area under the UI element 1401 becomes clearly visible. Therefore, when the user positions the UI element 1401 upon, e.g., a part of the obscured data, that part of the obscured data becomes clearly visible. For example, the data E5 positioned under the UI element 1401 become clearly visible. Therefore, the end user can view the obscured data without straining themselves. In one embodiment, the UI element can be of any other shape or size.

Figure 15:
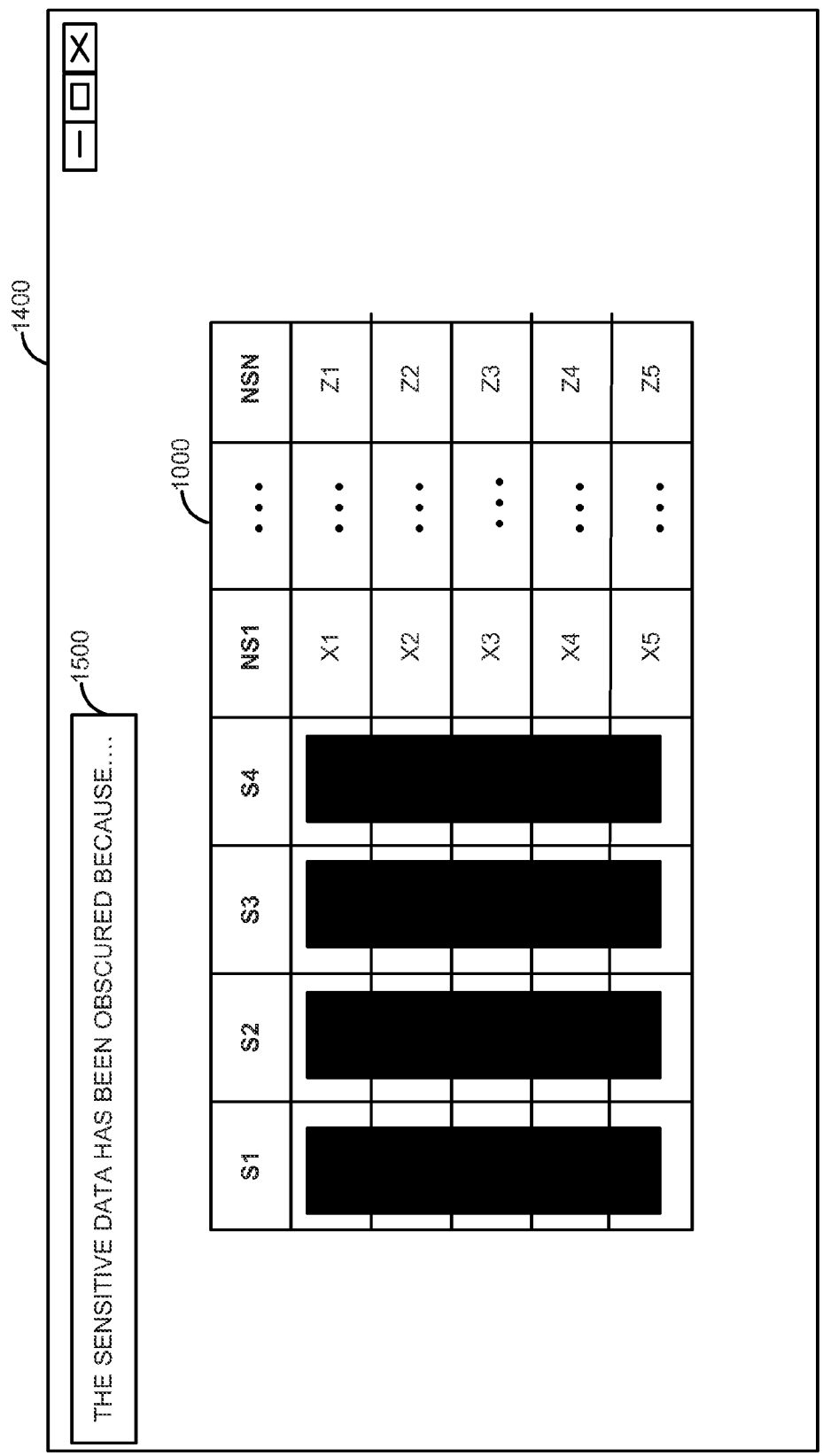
FIG. 15 illustrates the user interface including an information bar displaying information for obscuring the sensitive data, according to an embodiment.

In one embodiment, information or reasons for obscuring the sensitive data may also be displayed. The information for obscuring the sensitive data may be displayed in response to the user action such as on placing a cursor upon the obscured data. In one embodiment, as shown in FIG. 15, the information for obscuring the sensitive data is displayed within an information bar 1500 positioned at the top of the visually secured report.

In one embodiment, the display rule for obscuring the sensitive data of the report is automatically applied on the report before the screenshot of the report is taken.

An operating system (OS) of mobile devices like smartphone takes screenshot of the report while minimizing or closing the report. Typically, a function, e.g., applicationwillgotobackground( ) is automatically called while closing or minimizing the report. Once the function is called, the OS knows that the report is to be closed or minimized (going to background). After the execution of the function applicationwillgotobackground( ), the OS takes screenshot of the report and saves it in a backend. The screenshots from the backend can be easily retrieved by hackers. Generally, even if the mobile device is locked, a hacker can easily retrieve the stored screenshots, e.g., using a pen drive. Therefore, it is required to obscure the sensitive data in the screenshot. In one embodiment, a code for obscuring sensitive data of the displayed report is included within the function applicationwillgotobackground( ). Therefore, whenever the function applicationwillgotobackground( ) is called and executed, the sensitive data of report is obscured and the visually secured report is displayed on the screen. The OS then takes the screenshot of the visually secured report. The screenshot of the visually secured report is then saved in the backend.

Figure 16:
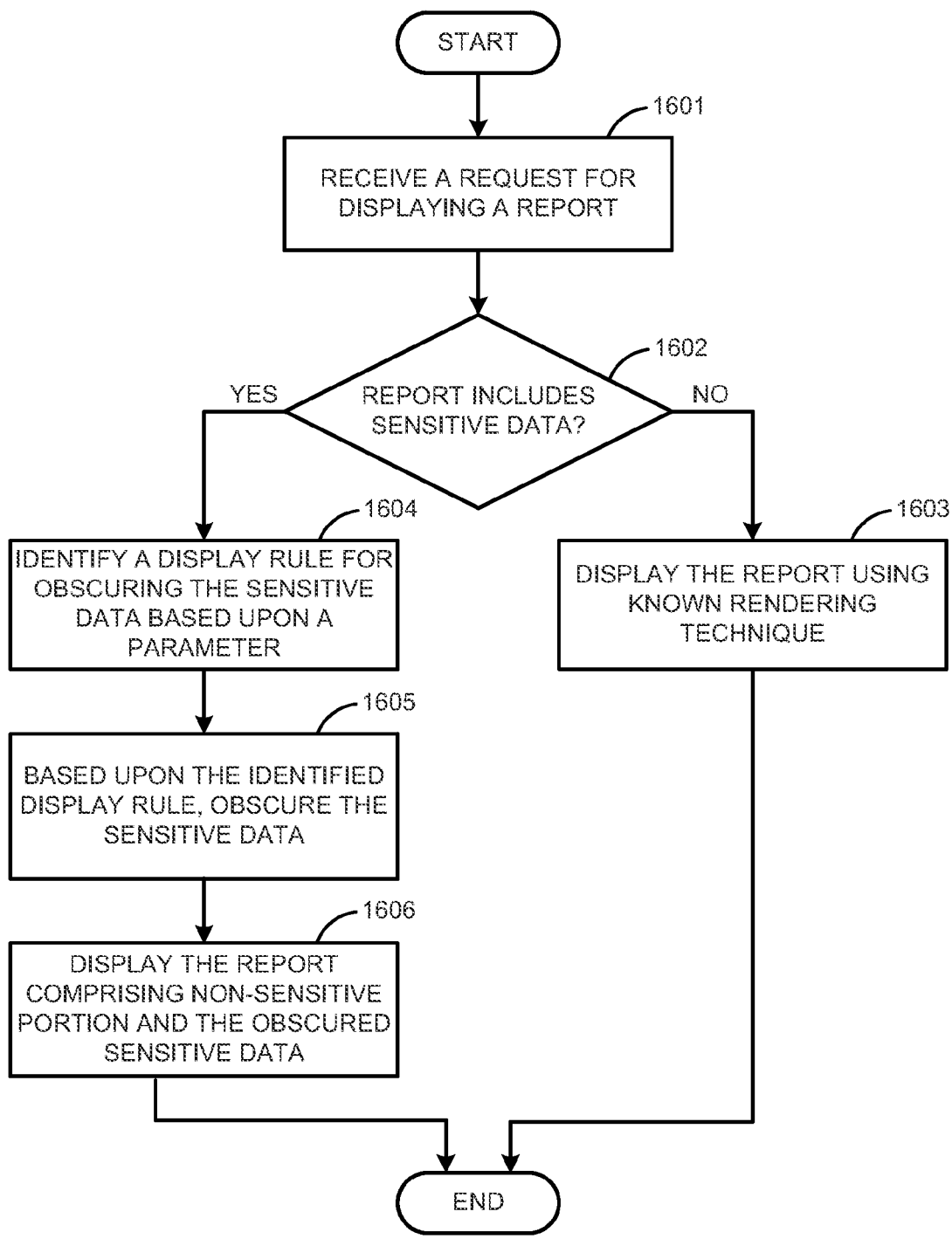
FIG. 16 is a flow chart illustrating the steps to display a report, according to an embodiment.

FIG. 16 is a flowchart illustrating a method for displaying the report 200, according to an embodiment. The request for displaying the report 200 is received at step 1601. The request may be sent through any portable computing device, e.g., the portable computing device 400. The request is received by the report rendering module 410. The report rendering module 410 is coupled to the server 500 storing various reports. The report rendering module 410 looks for the requested report 200 on the server 500. If the requested report is not available on the server 500, the report rendering module 410 displays the error message on the portable computing device 400. If the requested report 200 is available on the server 500, the report rendering module 410 generates the instance of the requested report 200. In one embodiment, the report rendering module 410 includes the securement module 110. The securement module 110 determines if the requested report 200 includes any sensitive data at step 1602. The availability of sensitive data may be determined by determining whether the property named 'IS_SENSITIVE' for any data is 'TRUE.' In case the report does not include any sensitive data (step 1602: NO), the report rendering module 410 renders the generated instance of the report as it is using known rendering techniques at step 1603. In case the report 200 includes sensitive data, e.g., data E1-E5, U1-U5, V1-V5, and W1-W5 (step 1602: YES), the securement module 110 identifies the display rule for obscuring the sensitive data at step 1604. The identified display rule is applied to obscure the sensitive data at step 1605. In one embodiment, the identified display rule is applied on the instance of the report 200 to obscure the sensitive data. The sensitive data is obscured to generate the visually secured report. The visually secured report including the non-sensitive portion and the obscured sensitive data is displayed at step 1606. In one embodiment, the sensitive data is obscured such that the sensitive data becomes invisible. In one embodiment, the sensitive data is obscured such that the sensitive data is difficult to read.

Embodiments described above enable visual securement of sensitive data within reports. Sensitive data within reports are visually secured (e.g., obscured) without hampering the accessibility of the reports. Therefore, users can access and work on the report without bothering about the security of the sensitive data. The sensitive data is automatically obscured using various techniques such as blurring, smudging, adjusting contrast, striking out, reducing font size, masking the sensitive data with a dark layer, etc. Embodiments are also flexible to incorporate new techniques of obscuring data. In some embodiment, sensitive data is visually secured depending upon various conditional parameters. In some embodiments, a magnifier glass kind of UI element is provided to enable users view the obscured data. The user can position the UI element upon the obscured data which becomes clearly visible and the user can easily view the obscured data without straining themselves.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 17:
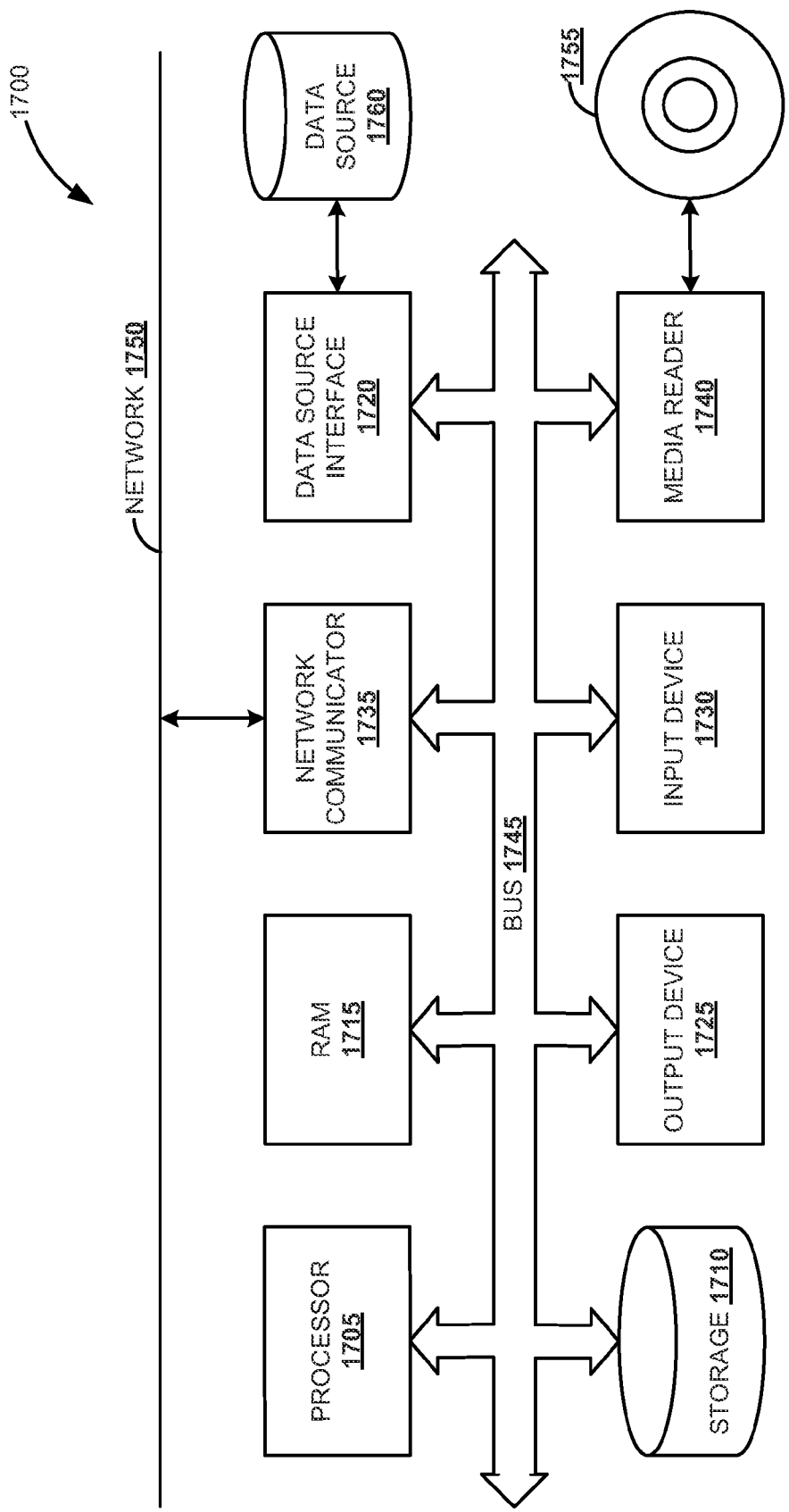
FIG. 17 is a block diagram of an exemplary computer system, according to an embodiment.

FIG. 17 is a block diagram of an exemplary computer system 1700. The computer system 1700 includes a processor 1705 that executes software instructions or code stored on a computer readable storage medium 1755 to perform the above-illustrated methods. The processor 1705 can include a plurality of cores. The computer system 1700 includes a media reader 1740 to read the instructions from the computer readable storage medium 1755 and store the instructions in storage 1710 or in random access memory (RAM) 1715. The storage 1710 provides a large space for keeping static data where at least some instructions could be stored for later execution. According to some embodiments, such as some in-memory computing system embodiments, the RAM 1715 can have sufficient storage capacity to store much of the data required for processing in the RAM 1715 instead of in the storage 1710. In some embodiments, all of the data required for processing may be stored in the RAM 1715. The stored instructions may be further compiled to generate other representations of the instructions and dynamically stored in the RAM 1715. The processor 1705 reads instructions from the RAM 1715 and performs actions as instructed. According to one embodiment, the computer system 1700 further includes an output device 1725 (e.g., a display) to provide at least some of the results of the execution as output including, but not limited to, visual information to users and an input device 1730 to provide a user or another device with means for entering data and/or otherwise interact with the computer system 1700. Each of these output devices 1725 and input devices 1730 could be joined by one or more additional peripherals to further expand the capabilities of the computer system 1700. A network communicator 1735 may be provided to connect the computer system 1700 to a network 1750 and in turn to other devices connected to the network 1750 including other clients, servers, data stores, and interfaces, for instance. The modules of the computer system 1700 are interconnected via a bus 1745. Computer system 1700 includes a data source interface 1720 to access data source 1760. The data source 1760 can be accessed via one or more abstraction layers implemented in hardware or software. For example, the data source 1760 may be accessed by network 1750. In some embodiments the data source 1760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments are to be determined by the following claims, which are to be interpreted in accordance with established doctrines of claim construction.

What is claimed is:

1. An article of manufacture including a non-transitory computer readable storage medium to tangibly store instructions, which when executed cause a computer to:
   from a portable computing device, receive a request for displaying a report;
   determine whether the report comprises sensitive data;
   when the report comprises the sensitive data, identify a display rule for masking the sensitive data, wherein the display rule is based on a parameter comprising network information of the portable computing device;
   based upon the identified display rule, mask the sensitive data;
   send the report comprising non-sensitive portion and the masked sensitive data for displaying on the portable computing device; and
   in response to positioning a navigable user interface element onto the masked sensitive data of the displayed report, unmask the masked sensitive data within the navigable user interface element to make the masked sensitive data within the navigable user interface element visible.

2. The article of manufacture of claim 1, wherein the network information comprises at least one of network address and connectivity status of the network.

3. The article of manufacture of claim 1, wherein the parameter further comprises at least one of a location of the portable computing device, an authentication information of a user accessing the report, and an email address of the user.

4. The article of manufacture of claim 1, wherein the report is a business intelligence report.

5. The article of manufacture of claim 1 further comprising instructions which when executed cause the computer to display reasons for masking the sensitive data in response to a user action.

6. The article of manufacture of claim 1, wherein determining whether the report comprises sensitive data includes determining whether one or more data fields of the report is configured as 'SENSITIVE.'

7. The article of manufacture of claim 1, wherein determining whether the report comprises sensitive data includes determining whether an access count of one or more data fields of the report exceeds a threshold value.

8. The article of manufacture of claim 1, wherein the display rule for masking the sensitive data is automatically applied when a command for taking a screenshot of the report is executed.

9. A computer-implemented method for visual securement of sensitive data, the method comprising:
   from a portable computing device, receiving a request for displaying a report;
   determining whether the report comprises the sensitive data;
   when the report comprises the sensitive data, identifying a display rule for masking the sensitive data, wherein the display rule is based on a parameter comprising network information of the portable computing device;
   based upon the identified display rule, masking the sensitive data;
   sending the report comprising non-sensitive portion and the masked sensitive data for displaying on the portable computing device; and
   in response to positioning a navigable user interface element onto the masked sensitive data of the displayed report, unmasking the masked sensitive data within the navigable user interface element to make the masked sensitive data within the navigable user interface element visible.

10. The method of claim 9, wherein the parameter further comprises at least one of:
   a location of the portable computing device;
   an authentication information of a user accessing the report; and
   an email address of a user to whom the report is to be sent.

11. The method of claim 9 further comprising displaying reasons for masking the sensitive data in response to a user action.

12. The method of claim 9, wherein determining whether the record comprises sensitive data includes determining whether one or more data fields of the record is configured as 'SENSITIVE.'

13. The method of claim 9, wherein determining whether the report comprises sensitive data includes determining whether an access count of one or more data fields of the report exceeds a threshold value.

14. A computer system for visual securement of sensitive data comprising:
   a memory to store program code; and
   a processor communicatively coupled to the memory, the processor configured to execute the program code to:
      from a portable computing device, receive a request for displaying a report;
      determine whether the report comprises sensitive data;
      when the report comprises the sensitive data, identify a display rule for masking the sensitive data, wherein the display rule is based on a parameter comprising network information of the portable computing device;
      based upon the identified display rule, mask the sensitive data;
      send the report comprising non-sensitive portion and the masked sensitive data for displaying on the portable computing device; and
      in response to positioning a navigable user interface element onto the masked sensitive data of the displayed report, unmask the masked sensitive data within the navigable user interface element to make the masked sensitive data within the navigable user interface element visible.

15. The computer system of claim 14, wherein the network information comprises at least one of network address and connectivity status of the network.

16. The computer system of claim 14, wherein the parameter further comprises at least one of a location of the portable computing device, an authentication information of a user accessing the report, and an email address of the user.

17. The computer system of claim 14, wherein the processor is further configured to execute the program code to display reasons for masking the sensitive data in response to a user action.

18. The computer system of claim 14, wherein the display rule for maskingthe sensitive data is automatically applied when a command for taking a screenshot of the report is executed.

19. The computer system of claim 14, wherein determining whether the report comprises sensitive data includes determining whether an access count of one or more data fields of the report exceeds a threshold value.

* * * * *